Patented Feb. 16, 1954

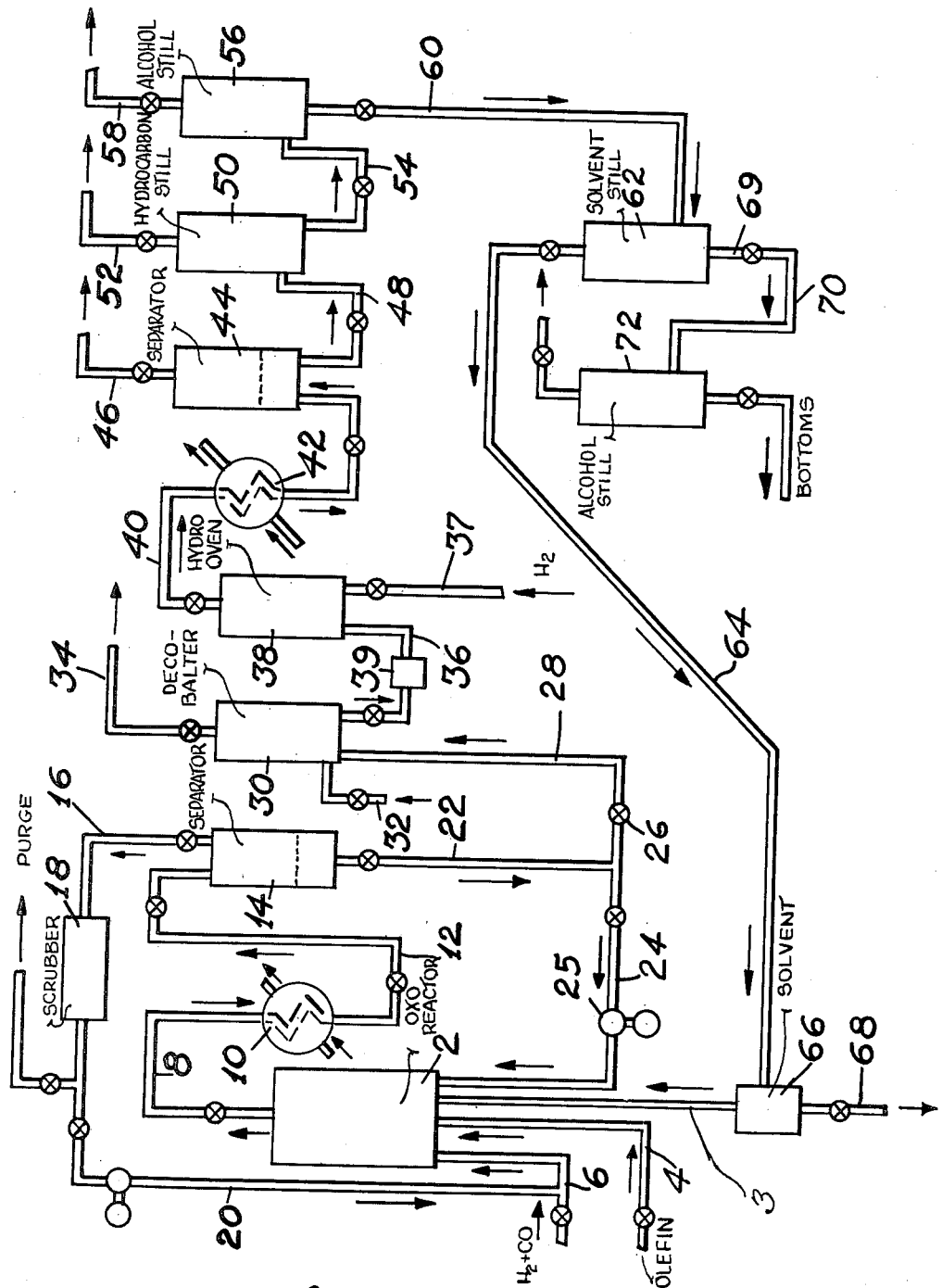

2,669,589

UNITED STATES PATENT OFFICE 2,669,589

ALCOHOL SYNTHESIS

William E. Catterall, Elizabeth, and Stanley C. Lane, Roselle, N. J., assignors to Standard Oil Development Company, a corporation of Delaware Application December 30, 1948, Serial No. 68,144

11 Claims. (Cl. 260—638)

The present invention relates to the preparation of oxygenated organic compounds by the reaction of olefinic carbon compounds with hydrogen and carbon monoxide in the presence of a carbonylation catalyst. More specifically, this invention relates to an improved process for increasing the yield of useful products obtained by the interaction of these reactants.

It is now well known that oxygenated organic compounds may be synthesized from olefinic organic compounds by reaction of the latter with carbon monoxide and hydrogen in the presence of a catalyst containing cobalt or iron or other carbonylation catalyst in a two-stage process. In the first stage the olefinic material, with or without solvent, and catalyst, and synthesis gases are reacted under pressure to give a product consisting predominantly of aldehydes containing one more carbon atom than the olefinic material, as well as a certain amount of secondary reaction products, condensation products, etc. This oxygenated organic mixture, which contains in solution compounds of the metal catalyst is then treated with heat to cause decomposition and removal of the soluble catalytic material from the organic mixture. The catalyst-free material may be then hydrogenated to the corresponding alcohol or oxidized to the corresponding carboxylic acid.

This carbonylation reaction provides a particularly attractive method for the preparation of valuable primary alcohols, for which there is a large demand in the field of plasticizers, detergents, and solvents. Not only long and short-chained olefinic hydrocarbons, but also most other types of organic compounds containing at least one olefinic double linkage, such as unsaturated acids, esters, alcohols, ketones, etc. are susceptible to this type of reaction.

The catalyst for the first stage of the reaction, wherein olefinic material is converted into aldehyde, is usually added in the form of salts of the catalytically active metal with high molecular weight organic acids, such as oleic, stearic, naphthenic, etc. Examples of such catalyst salts or soaps are cobalt or iron oleate, stearate, naphthenate, and the like. These salts are soluble in the liquid olefin or olefin-solvent mixture, and may be supplied to the first stage as dissolved in the feed or in the solvent.

As the synthesis gases are consumed at equivalent or equimolar rates, synthesis gas components are usually added in equimolar proportions of $H_2+CO$, though an excess of hydrogen may be used. The conditions for reacting olefinic compounds with hydrogen and carbon monoxide vary somewhat with the nature of the olefinic feed, but the reaction is generally conducted at pressures of about 3000 p. s. i. g. and at temperatures in the range of about 200°–450° F. The ratio of synthesis gas feed to olefin may vary widely; in general, about 2500 to 25,000 cubic feet of $H_2+CO$ per barrel of olefin feed are employed.

When the carbonylation process is applied to lower molecular weight normally gaseous olefins, such as ethylene, propylene, etc., it is usually desirable to employ a solvent or working liquid for the olefin in order to maintain liquid-phase reaction conditions. Thus the use of product alcohols and inert solvents such as hydrocarbons has been proposed. It may also be desirable to employ solvent when using a normally liquid olefin in the reaction.

One of the main problems that has been encountered in the carbonylation reaction has been the formation of secondary reaction products. These by-products arise out of the numerous secondary reactions that take place in the course of the main series of reactions which form alcohols containing one more carbon atom than the olefinic material from which they are prepared. Thus the carbonylation reaction proper is a highly exothermic one, with a heat release of the same high order of magnitude as in the hydrocarbon synthesis reaction, about 35–50 Kcal./gram-mol olefinic double bond reacted. For this reason, very careful temperature control is required in the carbonylation reaction zone to prevent decomposition of the carbonylation catalyst in its active form, the metal carbonyl, such as cobalt carbonyl, to metallic cobalt. Above 3000 p. s. i. g. (1500 p. s. i. g. CO partial pressure) cobalt carbonyl starts to decompose at an appreciable rate above 350° F. The presence of finely divided cobalt catalyzes such secondary reactions as hydrogenation of the olefin feed, dimerization and polymerization of the aldehydes formed, aldol condensation, etc. Furthermore, there is a partial reduction of the aldehydes to alcohols even in the carbonylation zone, and these alcohols react with unchanged aldehydes to produce acetal-type materials. Also, the Cannizzaro reaction takes place, wherein two mols of aldehyde react to form one mol of alcohol and one mol of acid, which may in turn esterify under the reaction conditions. These reactions may take place throughout the system in either the first stage or the second stage, and it is readily seen that the carbonylation reaction is accompanied by a significant amount of by-product formation.

It has been observed particularly that the application of the carbonylation reaction to propylene results not only in the expected mixture of butyl aldehydes and alcohols, but also, after hydrogenation of the first stage product, in significant amounts of octyl alcohols. The presence of these alcohols further complicates the problem of separation of the final products from the hydrogenation stage, when a solvent is used for the olefinic reactant. The use of product alcohol as a solvent has the undesirable drawback that it favors acetal formation in the first carbonylation stage with the aldehydes formed in this stage. The use of hydrocarbons as diluents for the low molecular weight olefins is complicated by the fact that the aldehyde and alcohol products of the reaction tend to azeotrope strongly with hydrocarbons, which thus makes separation of products from diluent by means of distillation rather difficult, particularly when it is desired to recover a series of products and recycle the diluent.

It is the principal purpose of the invention to provide a means whereby reaction product may be removed from the carbonylation reaction mixture substantially uncontaminated by solvent employed in the process.

It is another purpose of the present invention to provide a means whereby the solvent is recovered in a state pure enough so that higher boiling alcohols are not recycled to the process, thus avoiding acetal formation.

Other and further objects and advantages of the invention will appear hereinafter.

It has now been found that hydrocarbons having certain particular physical properties may be advantageously used as solvents for the carbonylation reaction without encountering undesirable by-product or azeotropic mixture formation. For example, when propylene is employed in the carbonylation reaction, in accordance with the invention, a hydrocarbon diluent is employed having a boiling point above about 300° F. and preferably above 328° F. in order to avoid contamination of the product butyl alcohols with hydrocarbon diluent in the final distillation.

Though the use of a hydrocarbon diluent boiling above the range indicated would result in a butyl alcohol product substantially free of azeotropically entrained hydrocarbons, nonetheless, because of the formation of secondary reaction products, particularly octyl alcohols, the attempt to recover the hydrocarbon solvent in order to recycle the same to the first stage would be attended by serious difficulties, particularly by the fact that at the higher distillation temperatures the hydrocarbon solvent would azeotropically entrain the higher molecular weight octyl alcohol. As previously indicated, this would have the undesirable result, when the solvent is recycled, of decreasing aldehyde or alcohol yield due to acetal formation.

In accordance with the invention, therefore, the boiling range of the diluent is chosen such that it forms substantially no azeotropes with the by-product alcohol having twice the number of carbon atoms as the principal product alcohol. Thus again when propylene is the olefinic feed, a hydrocarbon diluent boiling below about 348° F., and preferably below 342° F. is employed, thereby substantially minimizing the amount of $C_8$ alcohols entrained in the hydrocarbon diluent.

Thus combining the consideration of obtaining an alcohol product substantially free of entrained hydrocarbon diluent and of recovering a diluent substantially free of acetal-forming high boiling alcohol impurity, a very critical narrow-boiling range hydrocarbon diluent is employed in the carbonylation of low molecular weight olefinic hydrocarbons. The critical boiling range of the diluent is, of course, dependent upon the nature of the olefin. In accordance with the present invention, for an olefin feed of $n$ carbon atoms, a narrow-boiling hydrocarbon diluent, having a critical boiling range suitably intermediate between the alcohol produced from that olefin by the carbonylation reaction and an alcohol having twice the number of carbon atoms as the last-named alcohol is used. For propylene, a hydrocarbon diluent having a true boiling range not greater than from about 300°–348° F., preferably from 328°–342° F. is employed.

The critical boiling range is substantially independent of the nature of the hydrocarbon solvent, and applies equally well to paraffinic, naphthenic, or aromatic hydrocarbons or mixtures thereof. It is, of course, desirable to avoid the use of a diluent having an appreciable olefin content, as the latter would participate in the carbonylation reaction.

The present invention will best be understood from the more detailed description hereinafter, wherein reference will be made to the accompanying drawing, which is a schematic illustration of a system suitable for carrying out a preferred embodiment of the invention. Though the invention is applicable to all low-molecular weight olefinic hydrocarbons wherein the use of a solvent is desirable, for the purpose illustrating the invention, the use of propylene as feed is considered.

Referring now to the drawing, propylene is pumped through feed line 4 to the bottom portion of primary reactor 2. The latter comprises a reaction vessel which may, if desired, be packed with non-catalytic material, such as Raschig rings, porcelain chips, pumice, and the like. Reactor 2 may be divided into discrete packed zones, or it may comprise but a single packed zone or even, if desired, may contain no packing.

Concurrently through line 3 there is injected into reactor 2 a hydrocarbon solvent boiling within the narrow range of about 300°–348° F., preferably between about 328°–342° F. For the purpose of illustration, a suitably hydrogenated naphtha fraction is employed as solvent, though other non-olefinic hydrocarbons boiling in this range may also be employed.

The hydrocarbon solvent preferably contains dissolved therein 1–3% by weight (on the olefin) of cobalt naphthenate, stearate, or other high molecular weight cobalt soap. Other compounds of cobalt or iron, however, may also be used. The ratio of solvent to olefin preferably is about 1 to 4 parts of solvent per part of olefin by weight.

A gas mixture comprising $H_2$ and CO in the approximate ratio of 0.5–2 volumes of $H_2$ per volume of CO is supplied through line 6 to primary reactor 2 and flows concurrently through reactor 2 with the liquid feed. Reactor 2 is preferably operated at a pressure of about 2500–3500 p. s. i. g. and at a temperature of about 250°–450° F. The rate of flow of synthesis gases, olefin and solvent through reactor 2 is so regulated that the desired conversion level of the olefin is obtained.

Liquid oxygenated reaction products containing solvent, catalyst in solution, and unreacted synthesis gases are withdrawn overhead from an upper portion of high pressure reactor 2 and are transferred through line 8 to cooler 10 in which any conventional means of cooling are employed, and from there via line 12 to high pressure separator 14 where unreacted gases are withdrawn overhead through line 16, scrubbed in scrubber 18 free of entrained liquid and cobalt carbonyl, and preferably recycled to reactor 2 via line 20.

A stream of primary reaction product containing dissolved therein relatively high concentrations of cobalt carbonyl is withdrawn from separator 14 through line 22. A portion of said withdrawn stream may be recycled, if desired, to reactor 2 via line 24 and recycle pump 25 to aid in the cooling and maintaining of temperature control of the primary carbonylation stage. The balance of the primary reaction product may be withdrawn through pressure release valve 26 and through line 28. The withdrawn liquid may comprise unreacted olefin in solution and secondary reaction products as well as aldehydes and dissolved cobalt carbonyl; it is passed to a catalyst removal zone 30, wherein by suitable heat treatment at about 200°–400° F. the dissolved catalyst is decomposed to the metal. A stream of hydrogen comprising gas may be admitted to zone 30 through line 32 to aid in stripping and removing the evolved CO resulting from the decomposition of the metal carbonyl. Zone 30 may be operated at high pressures, though preferably pressures are in the range of 15–200 p. s. i. g. The gas stream comprising $H_2$ and CO may be removed from zone 30 through line 34 and used in any manner desired.

Liquid oxygenated products now substantially free of carbonylation catalyst are withdrawn from zone 30 through line 36 and passed through filter 39 to hydrogenator 38. Simultaneously hydrogen is supplied to reactor 38 through line 37 in proportions sufficient to convert the organic carbonyl compounds in the oxygenated feed, as well as acetals, polymerized materials, etc., into alcohols. Hydrogenator 48 may contain a mass of any conventional hydrogenation catalyst, such as nickel, copper chromite, tungsten or molybdenum sulfide, etc., either as such or supported on a carrier. Depending upon the catalyst, reactor 38 may be operated at pressures ranging from 2500–4500 p. s. i. g. and at temperatures of from about 300°–500° F. and an $H_2$ feed rate of from about 5000 to 20,000 normal cubic feet per barrel of total feed.

The products of the hydrogenation reaction and unreacted hydrogen may be withdrawn overhead through line 40 from reactor 38, then through cooler 42 into separator 44, where hydrogen and light gases may be withdrawn overhead through line 46 for disposal or use as desired. The liquid products and solvent are withdrawn from separator 44 through line 48 to hydrocarbon still 50 wherein are distilled low boiling products, mostly unconverted propylene and some butyraldehydes. The material boiling below about 220° F. is removed as a heads cut in hydrocarbon still 50, and this material is withdrawn overhead through line 52. A water-rich sidestream may be withdrawn from this still. The bottoms from this primary distillation are withdrawn from still 50 through line 54 and sent to alcohol still 56, where the product alcohol mixture, i. e., mixture of normal and isobutyl alcohols is removed overhead through line 58 by distillation at atmospheric pressures. The cut boiling in the range of about 220° to 250° F. is taken overhead.

The bottoms from alcohol still 56, comprising solvent, octyl alcohols, and higher boiling condensation and polymerization products are withdrawn through line 60 and passed to solvent recovery still 62, wherein the hydrocarbon solvent is taken as an overhead cut. The boiling range of the solvent is between 300° and 348° F., and preferably between 328°–342° F. Because of the critical narrow range of this solvent, not only is the butanol cut taken overhead in still 56 substantially free of solvents, but also the solvent cut taken overhead in still 62 is substantially free of both the butanols and of octyl alcohols. The overhead from still 62 is withdrawn and may be recycled to reactor 2 via line 64 and solvent storage tank 66. Additional solvent may be added via line 68, or solvent removed from the system.

The bottoms from solvents recovery still 62 may be withdrawn through line 69 and passed to still 72 via line 70 for recovery of octyl alcohols and/or other products. Still 72 may be operated at atmospheric or lower pressures. The bottoms from this distillation may, if desired, be further processed, or be used as fuel.

The system illustrated in the drawing and in the foregoing description admits of various modifications without departing from the spirit of the invention. Thus instead of separate injection of propylene and diluent into the reactor, the olefin may be dissolved in the diluent prior to injection into the primary carbonylation reaction stage. If desired, the distillation of products and diluents may be carried out in a single still instead of in a plurality of stills. Mention has not been made of various accessory equipment which normally are used in a commercial plant. Thus in the interest of good heat economy, various heat exchangers and economizers would be employed to utilize whatever heat is available in the most effective and efficient manner and, in order to control the process, pumps, compressors, valves, flow meters, etc., would be included in the equipment.

Although in the foregoing description propylene feed was employed as a specific example, other low molecular weight olefins having as many as 7 carbon atoms or more may be processed in substantially the same manner, provided that the hydrocarbon diluent is suitably chosen as limited by the following relationships. The critical boiling range which is in general satisfactory for the objectives of the process may be expressed as follows:

The lower limit or initial true boiling point is equal to or higher than the expression $$t = 208 + 31n$$

where $t$ is the boiling point expressed in degrees Fahrenheit at atmospheric pressure, and $n$ is the number of carbon atoms in the highest molecular weight olefin which is converted in the process to form a significant quantity of oxygenated products.

The upper limit or final true boiling point is about $t = 174 + 58m$ or lower, where $t$ is similarly expressed and $m$ is the number of carbon atoms in the lowest molecular weight olefin which is converted in the process to form a significant quantity of oxygenated products. In case the feed to the process consists of a mixture of olefins of different molecular weights and different degrees of reactivity, the diluent may still be suitably chosen by the foregoing expressions. Furthermore, these relationships may be used as one method of determining practical limitations in the width of feed cut, or boiling range of the feed olefin mixture, which is preferably chosen such that the boiling range of the corresponding diluent, calculated from the above equations, is not substantially greater than that of the diluent hydrocarbons economically available for operation of the process.

It has furthermore been found that within the boiling range defined by the foregoing equations, a somewhat more limited range is preferred for the most satisfactory operation of the process. This preferred range of boiling points is limited, in this case for olefin feeds comprising propylene or higher members of the series, by the following expressions:

Initial true boiling point, $t = 232 + 32n$, or higher
Final true boiling point, $t = 207 + 45m$, or lower where $t$ is the atmospheric boiling point in degrees Fahrenheit, and $n$ and $m$ are numbers greater than 2, $n$ representing the number of carbon atoms in the highest molecular weight olefin and $m$ representing the number of carbon atoms in the lowest molecular weight olefin which are respectively converted in the process to form a significant quantity of oxygenated products. In the case of ethylene the preferred boiling range is 280° to 290° F.

What is claimed is:

1. In a continuous carbonylation process wherein olefins, carbon monoxide and hydrogen are contacted with a carbonylation catalyst in a carbonylation zone under conditions to produce oxygenated organic compounds containing at least one more carbon atom per molecule than said olefinic compounds, the improvement which comprises employing as diluent in said carbonylation zone a non-olefinic hydrocarbon material having an atmospheric boiling range lying above a lower limit of about $208 + 31n$, where the boiling range is expressed in degrees Fahrenheit and $n$, a number greater than 2, is the number of carbon atoms in the highest molecular weight olefin which is converted to a significant quantity of said oxygenated compounds, and wherein said diluent has a boiling range lying below an upper limit of about $174 + 58m$, where $m$, a number greater than 2, is the number of carbon atoms in the lowest molecular weight olefin converted to a significant quantity of said oxygenated compounds.

2. The process of claim 1 wherein said hydrocarbon diluent has a boiling range lying above a lower limit of about $232 + 32n$.

3. The process of claim 1 wherein said hydrocarbon diluent has a boiling range lying below an upper limit of about $207 + 45m$.

4. The process of claim 1 wherein said olefin is propylene and said diluent has an atmospheric boiling range of about 300°–348° F.

5. The process of claim 4 wherein said boiling range is about 328°–342° F.

6. The process of claim 1 wherein said olefin is butene and said diluent has an atmospheric boiling range of about 332°–406° F.

7. The process of claim 6 wherein said boiling range is about 360°–387° F.

8. An improved process for synthesizing primary butyl alcohols from propylene, carbon monoxide, and hydrogen, which comprises feeding propylene and a non-olefinic hydrocarbon boiling in the range of about 300° to 348° F. and carrying a minor proportion of cobalt into a carbonylation zone, feeding into said reaction zone CO and $H_2$, maintaining conditions of feed rate, pressure, temperature, and residence time such that substantial quantities of said propylene are converted into oxygenated organic compounds comprising mainly butyraldehydes and butanols, withdrawing reaction products and unreacted material from said reaction zone, passing the withdrawn product to a catalyst removal zone, withdrawing a solution comprising aldehyde and alcohol product and said hydrocarbon diluent substantially free of dissolved cobalt compounds, passing said material to a hydrogenation zone wherein said material is subjected to a hydrogenation reaction, passing hydrogenated material comprising said diluent and major proportions of butyl alcohols and minor proportions of octyl alcohols to a distillation zone, recovering butyl alcohols from said zone substantially without contamination by said diluent, passing bottoms from said distillation zone to a diluent recovery zone, distilling said bottoms in said zone, recovering said diluent from said zone as an overhead product containing not more than minor proportions of octyl alcohols, and recycling at least a portion of said hydrocarbon diluent to said carbonylation reaction zone.

9. The process of claim 8 wherein said diluent boils in the range of about 328°–342° F.

10. The process of claim 8 wherein octyl alcohols are recovered from bottoms from said diluent recovery zone.

11. The process of claim 8 wherein the pressure in said carbonylation zone is in the range of about 2500–3500 p. s. i. g. and the temperature in the range of about 250°–360° F.

WILLIAM E. CATTERALL.
STANLEY C. LANE.

References Cited in the file of this patent

UNITED STATES PATENTS

| Number | Name | Date |
| --- | --- | --- |
| 2,437,600 | Gresham et al. | Mar. 9, 1948 |
| 2,473,995 | Gresham et al. | June 21, 1949 |
| 2,497,303 | Gresham et al. | Feb. 14, 1950 |
| 2,504,682 | Harlan | Apr. 18, 1950 |

OTHER REFERENCES

"The Oxo Process," Fiat Final Report No. 1000, PB. No. 81,383, Dec. 26, 1947, page 23, by Holm et al. Listed by OTS in its Bibliography of Scientific and Industrial Reports (vol. 7, No. 13, page 1134).